May 2, 1950 — H. SIEGAL — 2,506,471
HAND TRUCK
Filed Sept. 6, 1946 — 2 Sheets-Sheet 1

INVENTOR
HARRY SIEGAL
by: Louis Sheldon
ATTORNEY

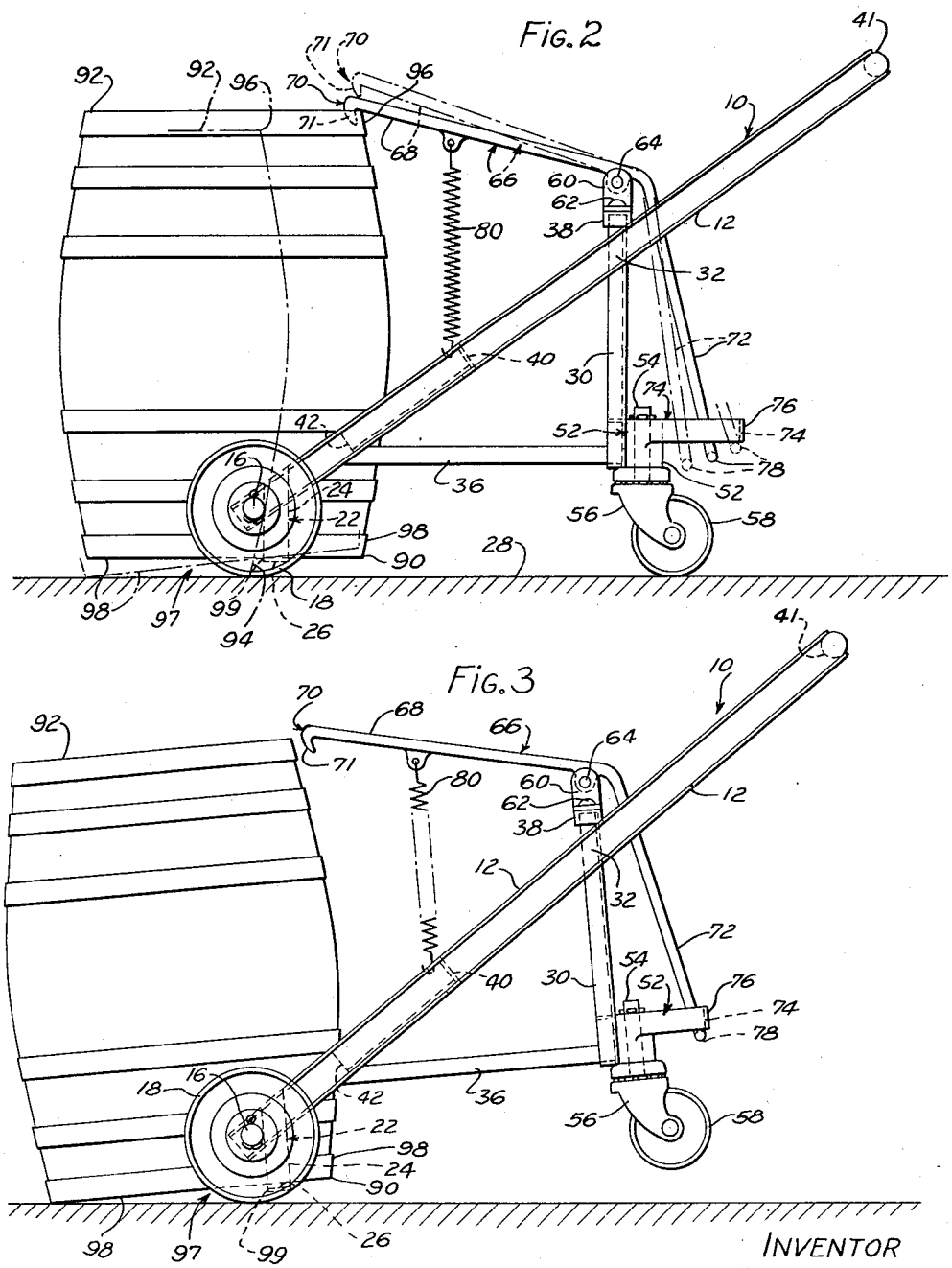

Patented May 2, 1950 — 2,506,471

UNITED STATES PATENT OFFICE 2,506,471

HAND TRUCK

Harry Siegal, Chicago, Ill.

Application September 6, 1946, Serial No. 695,177

6 Claims. (Cl. 214—65.4)

This invention relates to container handling devices, such as hand trucks, and is concerned more particularly with a device of this kind adapted to move filled upright open-head barrels and the like, with the level of liquid near the top, from place to place.

It is an object of my invention to provide a hand truck on which various sized open-topped liquid-filled barrels may be readily loaded and from which the barrel may be readily unloaded without spilling the liquid.

Another object is to provide a hand truck which is especially adapted for the expeditious and efficient loading, carrying, transporting and unloading of an uncovered barrel containing liquid, the level of the liquid being substantially at the top or brim thereof.

An additional object is to provide a hand truck having means for readily latching and supporting a liquid-filled open-topped barrel in non-spilling position thereon.

It is also an object to provide a hand truck having means for automatically latching an open-topped liquid-filled barrel thereon.

A further object is to provide a hand truck with means whereby a barrel carried thereby may be readily unlatched for speedy unloading thereof.

It is another object to provide, in connection with a spring-pressed barrel latch, means for preventing the spring from moving the hook excessively in the absence of a barrel, together with means for enabling the operator to trip the latch with minimum effort to unlatch a barrel carried by the truck.

It is a further object to provide a hand truck of the character referred to which is in stable equilibrium when carrying a barrel or the like.

It is also an object of my invention to provide a hand truck which can be economically constructed and has a minimum of movable parts, takes up little space and will turn substantially within its own radius.

Further objects and advantages of the invention will appear as the description proceeds.

The invention will be better understood upon reference to the following description and accompanying drawings, in which:

Fig. 2 is a side elevation of the same.

Fig. 3 shows the barrel in the position in which it is held by the operator before the latch is applied or just after the latch is withdrawn.

Figure 1:
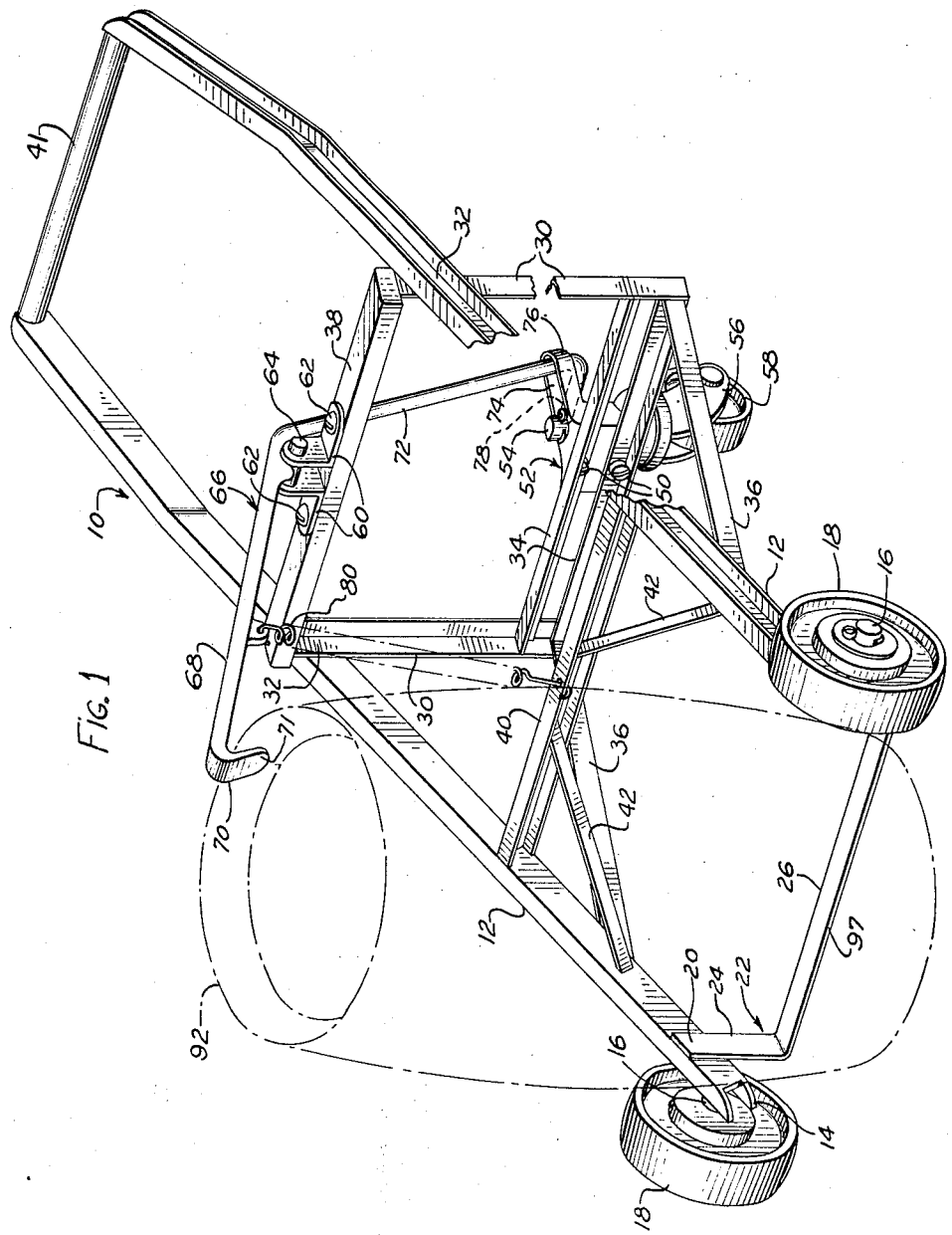
Fig. 1 is a top, front and side isometric view of a hand truck constructed in accordance with my invention.

Referring now more particularly to the drawings, I have shown at 10 a frame which may be made of any suitable material, such as metal bars. The frame chosen for illustrative purposes may comprise channel-shaped side rails 12, having flared forward ends 14 adjacent which are attached stub axles 16 carrying preferably rubber rollers or wheels 18. Welded or otherwise attached as at 20 to the side rails 12, slightly to the rear of the axis of the stub axles 16, is a stirrup or hanger 22 whose arms 24 depend from the side rails 12 and whose base or rung 26 is disposed only slightly above the level of the floor on which the truck rests.

Uprights 30 are welded as at 32 to intermediate portions of the respective side rails 12. The lower portions of the uprights 30 are bridged by parallel bars 34, and the lower end of each upright 30 is bridged to a forward portion of the adjacent side rail 12 by a strut 36. The upper ends of the uprights 30 are bridged by a bar 38. Forwardly of the bar 38 the side rails 12 are bridged by a bar 40. The rear end portions of the rails 12 are spanned by a preferably round bar 41 which rigidifies the frame and serves as a handle.

Reinforcing and guiding arms 42, which collectively may be substantially in the form of a V, have their divergent ends disposed forward and secured to the side rails 12, and their adjacent ends disposed rearward and secured substantially at the intermediate portion of the bar 40.

Mounted rearwardly of and on the bars 34, as shown at 50, is a bearing block 52 in which the spindle 54 of a caster yoke 56, by which a caster roller 58, preferably of rubber, is rotatably supported. It is thus apparent that when the rollers 18 and 58 are on the floor, the truck is in stable equilibrium.

Brackets 60 secured as at 62 to the bridge 38 afford trunnion bearings for a rockshaft 64, united by welding or otherwise to a bell-crank lever 66 having a forwardly extending arm 68 whose forward end is turned down to provide a latch hook 70 and is rearwardly inclined to provide a cam face 71. The lever 66 has a depending latch-trip arm 72 behind the bridge 38, passing downwardly through an opening 74, defined as by the caster bearing block 52 and a loop 76 whose ends may be welded or otherwise secured to the block, said arm terminating in a laterally offset pedal 78 projecting beyond the loop. The opening 74 is of such extent as to permit limited motion of the lever 66. A spring 80, having its ends anchored respectively to the bar 40 and the lever arm 68, is under tension and constantly urges the arm 68 with its hook 70 downward and, consequently, tends to hold the lower portion of the arm 72 in its rearmost position.

The truck, according to my invention, is particularly useful in an establishment such as a packing plant wherein barrels are filled with liquid alone or other substances with liquid, the level of the liquid being very close to the top chime so that only the securement of the cover to the barrel remains to be done. In such establishments the securement of the cover takes place at a point removed from the place at which the container is filled, and accordingly a hand truck is employed to remove the container to the station at which the cover is secured thereon. A barrel full of pickles and brine, or other solid substance with liquid, or liquid alone, is quite heavy, often on the order of several hundred pounds, so that the lifting thereof should be minimized, and the liquid is easily spilled, so that tilting thereof should be minimized.

My truck is so constructed that the tilting of and the effort of lifting the filled barrel to the extent necessary to mount the barrel on and unload the barrel from the truck are reduced practically to a minimum. Moreover, by reason of the stability of the truck when loaded with the filled barrel, tilting of the barrel enroute is precluded. When a barrel is to be loaded on to a truck constructed according to my invention, the truck is rolled into a position such that the hanger rail 26 is engaged with a lower rear portion of the barrel 90, as shown in dash-dot lines at 94 in Fig. 2. At such time the top chime 92 of the barrel is spaced slightly forward of the latch hook 70, as shown at 96. The operator thereupon pushes the upper rear end portion 96 of the top chime 92 so as to tilt the same forwardly about the lower forward end of the barrel to the slight extent, indicated at 97, necessary to enable the stirrup bar 26 to be slid under the rear end of the bottom chime 98 of the barrel, which the operator is easily able to do by pushing the truck while he holds the barrel in this slightly tilted position, said bar being disposed at so low a level that a very slight degree of tilt, insufficient to spill the contents of the barrel, is necessary. The back of the truck during this procedure is lifted by the operator (Fig. 3) to enable the rear 96 of the top chime 92 to engage the hook cam surface 71 and thereby cam the hook 70 up against the resistance of the spring 80, so that the hook thereafter is snapped into latched position (Fig. 2). Thereupon the truck is lowered, causing the barrel to swing down about the upper forward edge 99 of the hanger bar 26, said edge serving as a fulcrum, and slide against the inner sides of the bars 42, to be supported by the truck in stable equilibrium, thus requiring no further attention. Now the barrel is properly supported on the truck as shown in full lines in Fig. 2. When the truck has reached its destination, the operator first tilts the rear of the truck up until the front of the barrel rests on the floor. Then he presses the pedal 78 down with his foot to withdraw the latch hook 70 and withdraws the truck from under the barrel, whereupon the barrel is allowed to swing and slide by gravity slowly to the floor. To reduce friction of the barrel on the hanger bar 26, the upper surface of the hanger may be rounded. Even if originally flat, it will become rounded from wear.

Stability of the truck is a safety factor since the barrel does not have to be held in balance and thus the danger of a slippery floor is removed. In fact a loaded truck, when held onto by the operator, will keep him from falling.

The center of gravity of the barrel, when supported in proper position on the truck, is disposed only slightly forward of the forward edge 99 of the stirrup bar 26, but the center of gravity of the truck itself is located substantially to the rear of the stirrup bar 26 and substantially overbalances the loaded barrel, so that the combined truck and loaded barrel are in stable equilibrium. A 45 gallon barrel of pickles and brine weigh approximately 450 lbs. and yet is easily handled by one man using my truck.

It is obvious from the foregoing that the truck is equally useful in transporting closed barrels, since the cover of the barrel is disposed well below the top of the top chime.

The wheels may be rubber tired and roller or ball bearings may be used therefor.

The frame may be made of any suitable material, and, as noted above, it will be observed that the truck is simple in construction and operation.

Various modifications coming within the spirit of my invention may suggest themselves to those skilled in the art, and hence I do not wish to be limited to the specific form shown or uses mentioned, except to the extent indicated in the appended claims, which are to be interpreted as broadly as the state of the art will permit.

I claim:

1. A hand truck having a pair of wheels at the fore part thereof, said wheels being mounted on stub axles, spaced substantially apart, a frame having side rails connected to said stub axles and inclined upwardly and rearwardly therefrom, a caster connected to and disposed at the rear part of said frame and serving with the aforesaid wheels to support said frame in stable equilibrium, the rear part of said frame affording a handle, a stirrup secured to the fore part of said frame and having a horizontal hanger portion extending substantially throughout the distance between said side rails and disposed adjacent the plane of the bottoms of said wheels and caster, a spring-pressed latch adapted to be biased into the top rear portion of the barrel when the barrel rests on said hanger portion free of the floor, said latch having a cam surface engageable by the top chime of the barrel whereby to snap the latch into place pursuant to backward movement of the top of the barrel as the barrel is mounted onto the truck, said truck being swingable by the operator upward about said front wheels to bring the front of the bottom of the barrel in contact with the floor, means operative by the operator's foot while he stands at the rear of said frame for withdrawing said latch against the resistance of the spring, said hanger portion being disposed slightly rearward of the plumb line through the center of gravity of the said barrel when the barrel is mounted on the truck, the center of gravity of the combined truck and barrel being well to the rear of said front wheels, whereby the barrel and truck are in stable equilibrium, and means limiting rearward movement of the barrel on the truck.

2. A hand truck having two front supporting wheels and a rear wheel and comprising a frame having forward and rear portions, a handle associated with the rear portion, a hanger associated with the forward portion and having a substantially horizontal part disposed adjacent the front wheels but spaced slightly above the plane of the bottoms of said wheels, a latch engageable within the open top of a barrel resting on said hanger part, so as to prevent the barrel from tilting forward about said part, said truck being tiltable by the operator about said front wheels, means enabling the operator to retract said latch, and means biasing said latch toward latching position.

3. A hand truck comprising a frame having front and rear portions, stub axles extending outwardly from the front portion of said frame, wheels on said axles, a caster mounted adjacent the rear portion of said frame, a barrel support mounted on the front portion of said frame between said axles and including a horizontal hanger part extending substantially throughout the distance between said axles, said hanger part being disposed adjacent but spaced above the plane of the bottoms of said wheels and caster, a spring-pressed latch mounted on said frame and spring-biased toward and engageable in the top of a barrel resting on said hanger part, whereby to prevent such a barrel, arranged with its center of gravity forward of said hanger part, from tilting forward off said part, and foot-operated means operable by the operator against the resistance of the spring for shifting said latch to inoperative position when the barrel is to be loaded onto and unloaded from the truck.

4. A hand truck comprising a frame having laterally spaced rails with fore and aft portions, a handle associated with the aft portions, wheels associated with the fore portions of said rails, the space intervening said fore portions of said rails and said wheels being clear, a caster associated with the aft portion of said frame, a horizontal bar connected to said rails adjacent said space, and disposed above and adjacent the platform on which said wheels and caster rest, a bell-crank latch lever pivoted to said frame and having a depending arm with a pedal, a spring connected to said frame and lever, means for limiting movement of said pedal in response to said spring, the other arm of said lever extending forwardly and terminating in a downwardly extending hook disposed to engage the rear inner portion of the top chime of a barrel resting on said bar, the relation of said hook to said bar being such that, when the barrel is on said bar and said hook is in operative relation to a barrel, the center of gravity of the barrel is disposed forwardly of said bar, said hook being retractable out of engagement with the barrel pursuant to movement of said pedal by the operator, said hook being disposed in such proximity to said pedal that the upper rear portion of the barrel is within easy reach of the operator while the pedal is moved by the operator's foot, to enable the operator, while standing at the aft portion of said frame, to tilt the barrel forward in the process of mounting the barrel on the truck and to control the rearward tilting of the barrel to the platform.

5. A hand truck comprising a frame, at least three wheels associated with said frame for supporting it in stable equilibrium, means associated with said frame for supporting a container on said truck, with the bottom of the container in close proximity to the platform on which said wheels rest, said means including a spring-pressed latch having a hook spring-pressed into engagement within and adjacent the rear of the top chime of the container, means preventing movement of said hook in such direction substantially beyond said position, said hook, when in said position, projecting a relatively small distance into the container, whereby the movement of said hook necessary to retract the same from said container is relatively short, means operable by the operator at the same time that he grasps the upper rear portion of said chime, to retract said hook and permitting the operator at the same time to control tilting of the barrel onto the platform.

6. A hand truck comprising at least three wheels and a frame supported thereon, means associated with said frame for supporting a barrel or the like at a level closely proximate to the platform on which the truck rests, a bell-crank latch lever pivoted on said frame, means limiting movement of said lever to a relatively small angle, one arm of said lever extending forward and having a hook projectable into the top chime of a barrel and engageable with the rear portion of such chime when the barrel is supported on said frame, said lever being biased to latching position, and means within easy reach of the operator for enabling him to retract said hook without interfering with his grasping the upper rear part of the container to prevent the container from toppling upon withdrawal of said hook.

HARRY SIEGAL.

REFERENCES CITED

The following references are of record in the file of this patent:

UNITED STATES PATENTS

| Number | Name | Date |
|---|---|---|
| 638,215 | Condon | Dec. 5, 1899 |
| 1,012,139 | King | Dec. 19, 1911 |
| 1,124,767 | Loton | Jan. 12, 1915 |
| 2,360,858 | Ernst | Oct. 24, 1944 |

FOREIGN PATENTS

| Number | Country | Date |
|---|---|---|
| 781,794 | France | Mar. 4, 1935 |